United States Patent [19]

Jensen et al.

[11] Patent Number: 5,418,300
[45] Date of Patent: * May 23, 1995

[54] CRYSTALLINE IMIDE/ARYLENE ETHER COPOLYMERS

[75] Inventors: Brian J. Jensen, Williamsburg; Paul M. Hergenrother, Yorktown; Robert G. Bass, Richmond, all of Va.

[73] Assignee: The United States of America as represented by the Administrator, National Aeronautics and Space Administration, Washington, D.C.

[ * ] Notice: The portion of the term of this patent subsequent to May 12, 2009 has been disclaimed.

[21] Appl. No.: 225,410

[22] Filed: Apr. 8, 1994

Related U.S. Application Data

[63] Continuation of Ser. No. 575,738, Aug. 31, 1990, abandoned, which is a continuation-in-part of Ser. No. 439,317, Nov. 21, 1989, Pat. No. 5,112,923.

[51] Int. Cl.$^6$ ............................................... C08L 79/08
[52] U.S. Cl. ..................................... 525/436; 525/420
[58] Field of Search ......................... 525/435, 420, 436

[56] References Cited

U.S. PATENT DOCUMENTS 4,870,155  9/1989  Metzner et al. ..................... 528/229
4,873,295  10/1989  Kurosawa et al. .................. 525/420

*Primary Examiner*—Ana L. Carrillo
*Attorney, Agent, or Firm*—George F. Helfrich

[57] ABSTRACT

Crystalline imide/arylene ether block copolymers are prepared by reacting anhydride terminated poly(amic acids) with amine terminated poly(arylene ethers) in polar aprotic solvents and chemically or thermally cyclodehydrating the resulting intermediate poly(amic acids). The block copolymers of the invention have one glass transition temperature or two, depending on the particular structure and/or the compatibility of the block units. Most of these crystalline block copolymers form tough, solvent resistant films with high tensile properties. While all of the copolymers produced by the present invention are crystalline, testing reveals that copolymers with longer imide blocks or higher imide content have increased crystallinity.

6 Claims, 2 Drawing Sheets

CRYSTALLINE IMIDE/ARYLENE ETHER COPOLYMERS

ORIGIN OF THE INVENTION

The invention described herein was made jointly in the performance of work under NASA Grant No. NAG-1-239 with the Virginia Commonwealth University and employees of the United States Government. In accordance with 35 U.S.C. 202, the grantee elected not to retain title.

CROSS-REFERENCE

This is a continuation of application Ser. No. 07/575,738, filed on Aug. 31, 1990, now abandoned, which is a continuation-in-part of our application Ser. No. 07/439,317, filed Nov. 21, 1989, now U.S. Pat. No. 5,112,923.

BACKGROUND OF THE INVENTION

1. Technical Field of the Invention

The present invention relates generally to high performance structural resins for advanced aerospace applications. It relates particularly to a tough, solvent resistant, crystalline imide/arylene block copolymer with a broad melting point, and especially to adhesives and composites thereof.

2. Description of the Prior Art

Polyimides are condensation polymers commonly synthesized by the reaction of aromatic dianhydrides with aromatic diamines. The intermediate poly(amic acid) is either thermally or chemically cyclodehydrated to form the polyimide, which has a repeat unit of the general type

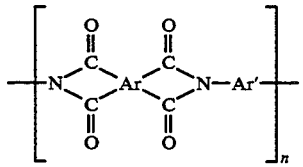

Ar is a tetravalent aromatic radical which can be as simple as 1,2,4,5-tetrasubstituted benzene, or may be as complex as a bis-4-(o-diphenylene) having the general structure

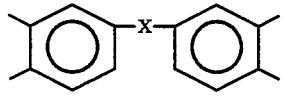

where X=nil, O, S, $SO_2$, C=O, etc. As well, Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene or any other appropriate divalent radical.

Synthesis and characterization of polyimides has been extensively reported in the literature. The preparation of aromatic polyimides by reaction of an aromatic dianhydride with an aromatic diamine, followed by thermal cyclization was first reported in 1963 [G. M. Bower and L. W. Frost, *Journal of Polymer Science A*1, 3134 (1963)] with patents awarded in 1965 [Edwards, U.S. Pat. No. 3,179,614 and U.S. Pat. No. 3,179,634; Endrey, U.S. Pat. No. 3,179,631 and U.S. Pat. No. 3,179,633]. Several reviews on polyimides have been published [S. E. Sroog, "Polyimides" in Encyclopedia of Polymer Science and Technology, (H. F. Mark, N. G. Gaylord, and N. M. Bikales, Ed.), Interscience Publishers, New York, 1969 Vol. 11, pp. 247-272; N. A. Adrova, M. I. Bessonov, L. A. Lauis and A. P. Rudakov, *Polyimides*, Technomic Publishing Co., Inc., Stamford, Conn., 1970].

Wholly aromatic polyimides are known for their exceptional thermal, thermooxidative, and chemical resistance but are generally difficult to process as structural adhesives or composite matrices. Several polymides such as Kapton® [DuPont], PI-2080 [Upjohn], XU-218 [Ciba-Geigy], Ultem® [General Electric], and LARC-TPI [Mitsui Toatsu] are commonly available commercially and used as films, moldings, adhesives, and composite matrices.

Poly(arylene ethers) are condensation polymers commonly synthesized by nucleophilic displacement of activated aromatic halides in polar solvents by alkali metal phenates to form a repeat unit of the general type

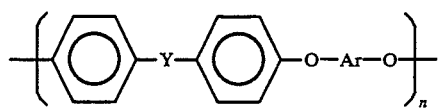

Ar is arylene and y=C=O, $SO_2$, etc.

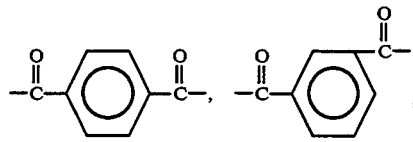

Nucleophilic displacement reactions leading to high molecular weight poly(arylene ethers) were initially reported in 1958 [A. Kreuchumas, U.S. Pat. No. 2,822,351 (1958)]. Since then, numerous papers [R. N. Johnson, et al., *J. Polym. Sci. A*1, 5,2375 (1967); S. V. Vinogradova, et al., *Polym. Sci. USSR*, 14, 2963 (1972); J. B. Rose, *Polymer*, 15, 456 (1974); T. E. Attwood, et al., *Polym. Prepr.*, 20(1), 191 (1979); R. Viswanathan, et al., *Polymer*, 25, 1927 (1984); and P. M. Hergenrother, et al., *Polymer*, 29, 258 (1988)] and patents [Jones, British 1,016,245 (1962), Vogel, British 1,060,546 (1963); Goodman, et al., British 971,277 (1964); Farnham, et al., British 1,078,234 (1973); and Farnham U.S. Pat. No. 4,175,175 (1979)] have appeared.

Poly(arylene ethers) are known for their good mechanical properties, good thermooxidative stability, relative ease of processing, and solubility in common organic solvents. For certain applications, resistance to common organic solvents is a requirement. Several poly(arylene ethers) such as Udel® polysulfone [Amoco], Kadel® polyketone [Amoco], PEEK® polyetherketone [ICI] are commercially available and used as films, moldings, adhesives, and composite matrices.

Amine terminated arylene ethers have been prepared by several different methods. The preparation of amine terminated polysulfone oligomers using p-aminophenol as the end-capping compound was reported in 1974 [J.

H. Kawakami, et. al., *J. Polym. Sci. Poly. Chem. Ed.*, 12, 565 (1974)]. More recently, the preparation of amine terminated polysulfone and poly(arylene ether ketone) oligomers using m-aminophenyl-4'-hydroxyphenyl-2.2-isopropylidene has been reported [M. J. Jurek, et al., *Polym. Prepr.*, 26(2), 283 (1985); G. D. Lyle, et al., *Polym. Prepr.*, 28(1) 77 (1987)].

The introduction of crystallinity into a polymer has long been recognized as an effective means of improving the solvent resistance and increasing the modulus. In addition, if the proper degree and type of crystallinity is attained, the material can also display extremely high toughness. Notable examples are PEEk® polyetheretherketone [IC] and LARC-CPI [P. M. Hergenrother, et al., *SAMPE Journal*, 24(4) 13 (1988)] which exhibit very high fracture toughness ($G_{IC}$, critical strain energy release rate) and are highly solvent resistant.

SUMMARY OF THE INVENTION

Accordingly, it is a primary object of the present invention is to provide a series of block copolymers that contain polyimide and poly(arylene ether) segments.

Another object of the present invention is to provide a block copolymer that contains polyimide and poly(arylene ether) segments, such that the copolymer has a high degree of crystallinity.

Another object of the present invention is to provide a block copolymer that contains polyimide and poly(arylene ether) segments, wherein the length of the polyimide and poly(arylene ether) segments are easily controlled, so that copolymers with various desired physical and mechanical properties can be produced.

Another object of the present invention is to provide a block copolymer that contains polyimide and poly(arylene ether) segments, wherein the copolymer forms a tough, solvent resistant film and coating material.

Another object of the present invention is to provide a block copolymer that contains polyimide and poly(arylene ether) segments, wherein the copolymer forms a film and coating material with high tensile properties.

Another object of the present invention is to provide a film and coating material useful for both industrial and aerospace applications requiring adhesives and composites, with good solvent resistance and high tensile properties, such as strength, modulus and elongation.

By the present invention, the foregoing and additional objects were obtained by synthesizing imide/arylene copolymers from the reaction of anhydride terminated poly(amic acids) and amine terminated poly(arylene ethers). After curing, the resulting block copolymers had glass transition temperatures ranging from 165° C. to 220° C. Some had two glass transitions, corresponding to the arylene/ether segment and the imide segment, indicating a phase separation in the films due to polymer-to-polymer incompatibility. The block copolymers also had broad crystalline melting points ($T_m$) from 335° C. to 355° C. Some had two $T_m$s and, therefore, possibly two crystalline forms. Solution cast films of the block copolymers were tough and flexible with tensile strength, tensile moduli, and elongation at break up to 16,200 psi, 535,000 psi, and 8% respectively at 25° C. And, depending on the glass transition temperatures of the arylene/ether segment, some block copolymers maintained good mechanical properties at 93° C. and 177° C.

Moldings were prepared from polymers which were solution imidized, by distilling a toluene/water azeotropic mixture from the reaction at 155° C. for 16 hours, to form powders. The powders were compression molded in stainless steel molds in hydraulic presses with electrically heated platens. The moldings were machined into compact tension specimens and tested for toughness. The values of fracture toughness, $K_{IC}$, and fracture energy, $G_{IC}$, for the homopolymers are extremely high and values for the copolymers are excellent and increase with increasing block length.

Wide-angle x-ray scattering data indicated that block and segmented copolymer films cured up to 300° C. for 1 hour and solution imidized powders were crystalline. Furthermore, copolymers with longer imide blocks or higher imide content had more intense and sharper x-ray peaks, indicating more crystallinity than the others.

DESCRIPTION OF THE PREFERRED EMBODIMENTS

Figure 1:
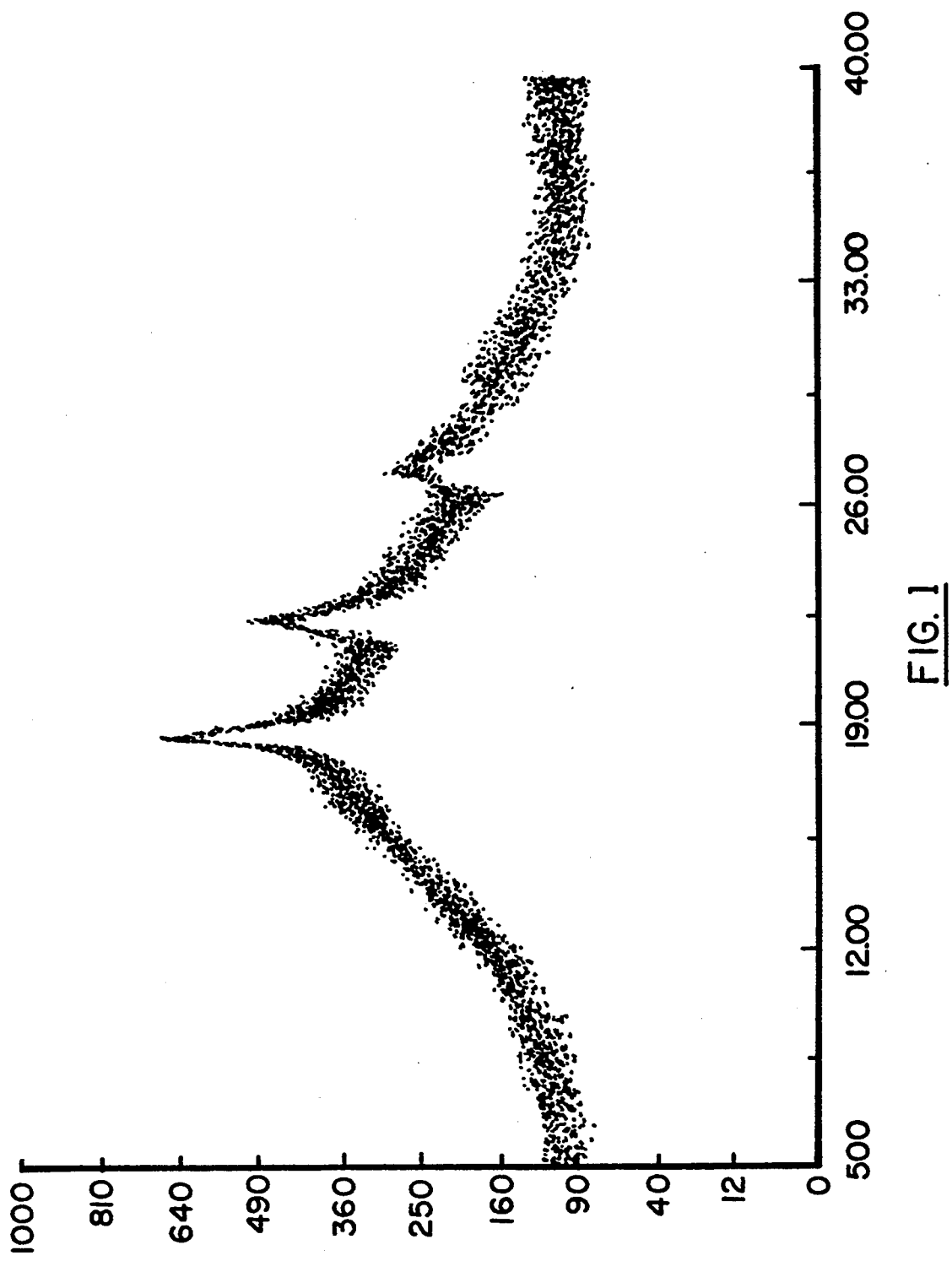
FIG. 1 demonstrates wide-angle x-ray scattering data for a copolymer film of the present invention.

The general reaction sequence for the block copolymers of the present invention is represented by the following equation:

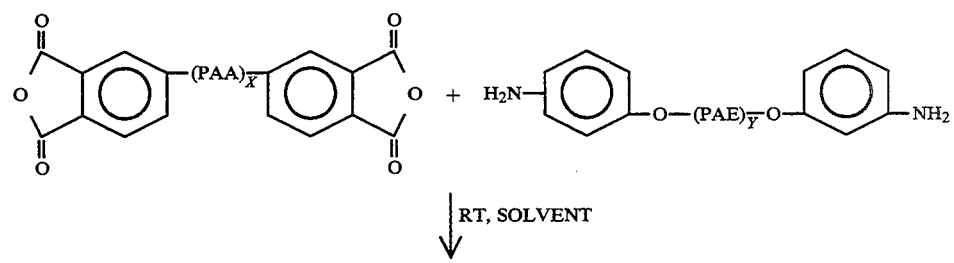

-continued

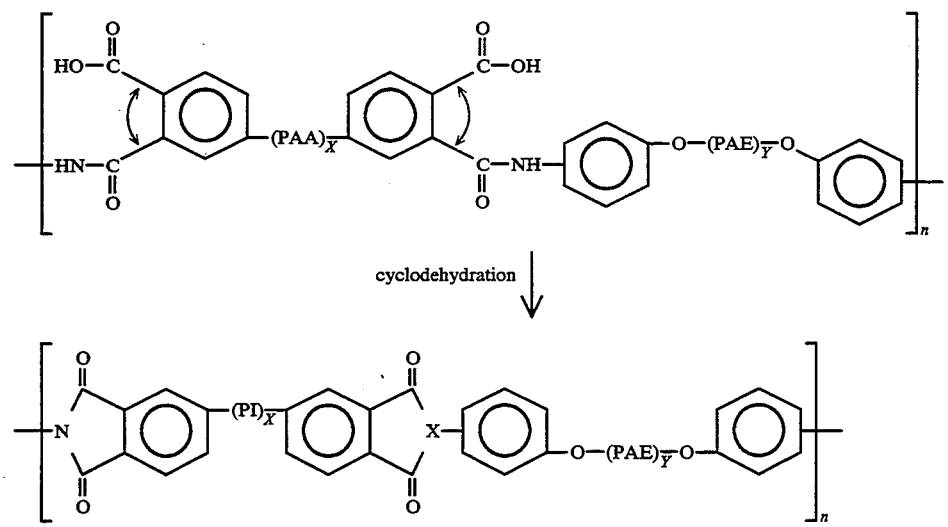

wherein n is an integer from 4 to 100. The solvent is preferably N,N-dimethylacetamide, but it may be N-methylpyrrolidinone, m-cresol, N,N-dimethylformamide, dimethyl sulfoxide, or ether solvents such as diglyme.

Cyclodehydration is accomplished chemically or by heating the intermediate poly(amic acid) at temperatures exceeding 150° C.

PAA is representative of a poly(amic acid) synthesized by reacting excess dianhydride with a diamine as generically shown below:

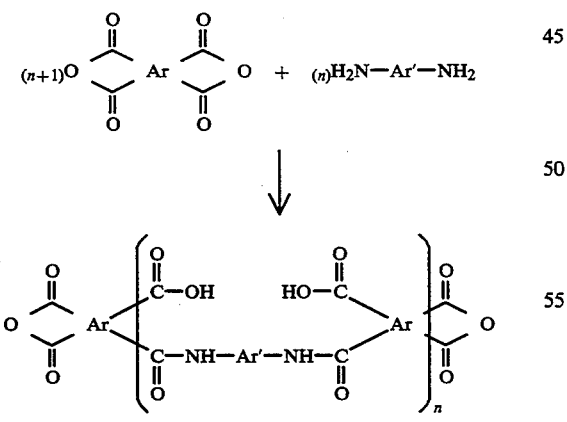

wherein n is an integer from 4 to 100. The solvent is preferably N,N-dimethylacetamide, but it may be N-methylpyrrolidinone, m-cresol, N,N-dimethylformamide, dimethyl sulfoxide or ether solvents such as diglyme.

PI is representative of a polyimide synthesized by the cyclodehydration of the PAA component as generically shown below:

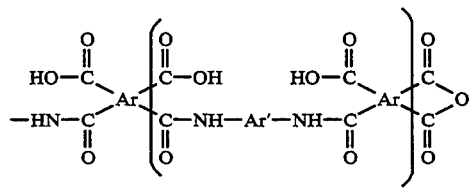

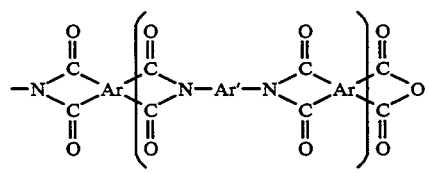

Ar is selected from a group of radicals consisting of:

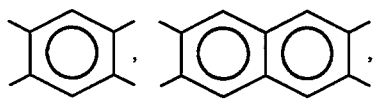

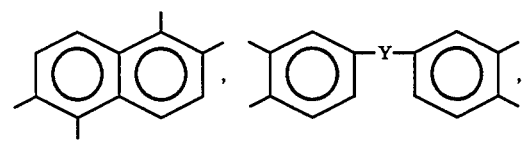

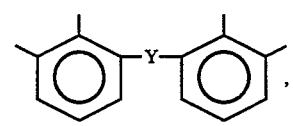

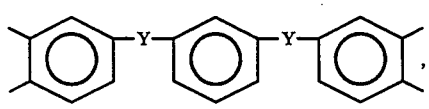

-continued

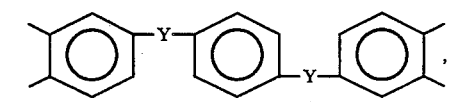

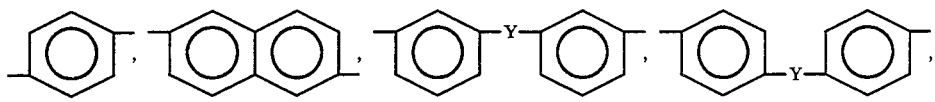

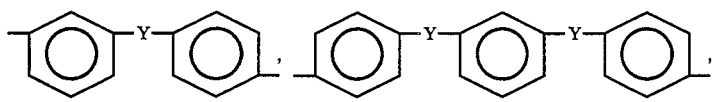

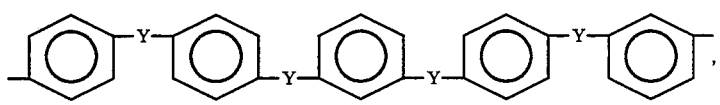

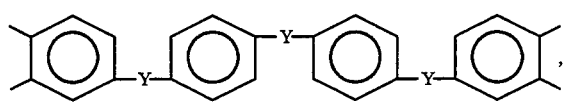

wherein Y is not a substituent or is a substituent selected from the group consisting of O, C=O, and C(CF$_3$)$_2$.

PAE is representative of a poly(arylene ether) synthesized by reacting an activated aromatic dihalide with a bisphenol as generically shown below:

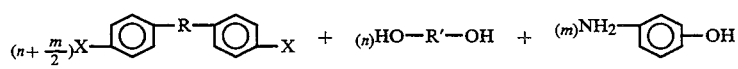

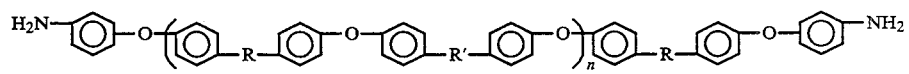

wherein n is an integer from 4 to 100. The solvent is preferably N,N-dimethylacetamide, but may be other solvents such as N-methylpryrrolidinone, N,N-dimethylformamide, or dimethyl sulfoxide.

X is either a fluorine or chlorine atom. The Base is an alkali metal hydroxide or carbonate selected from the group consisting of NaOH, KOH, Na$_2$CO$_3$ and K$_2$CO$_3$.

R and R' are selected from a group of aromatic radicals consisting of:

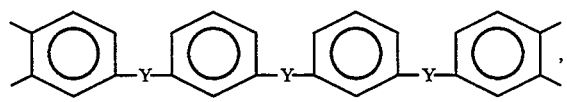

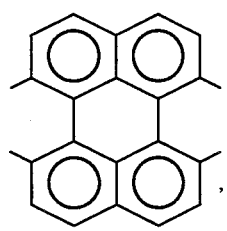

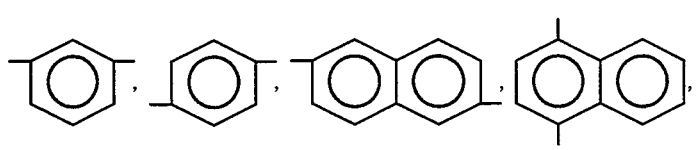

wherein Y is not a substituent or is a substituent selected from the group consisting of O, C=O, and C(CF$_3$)$_2$.

Ar' is selected from a group of radicals consisting of:

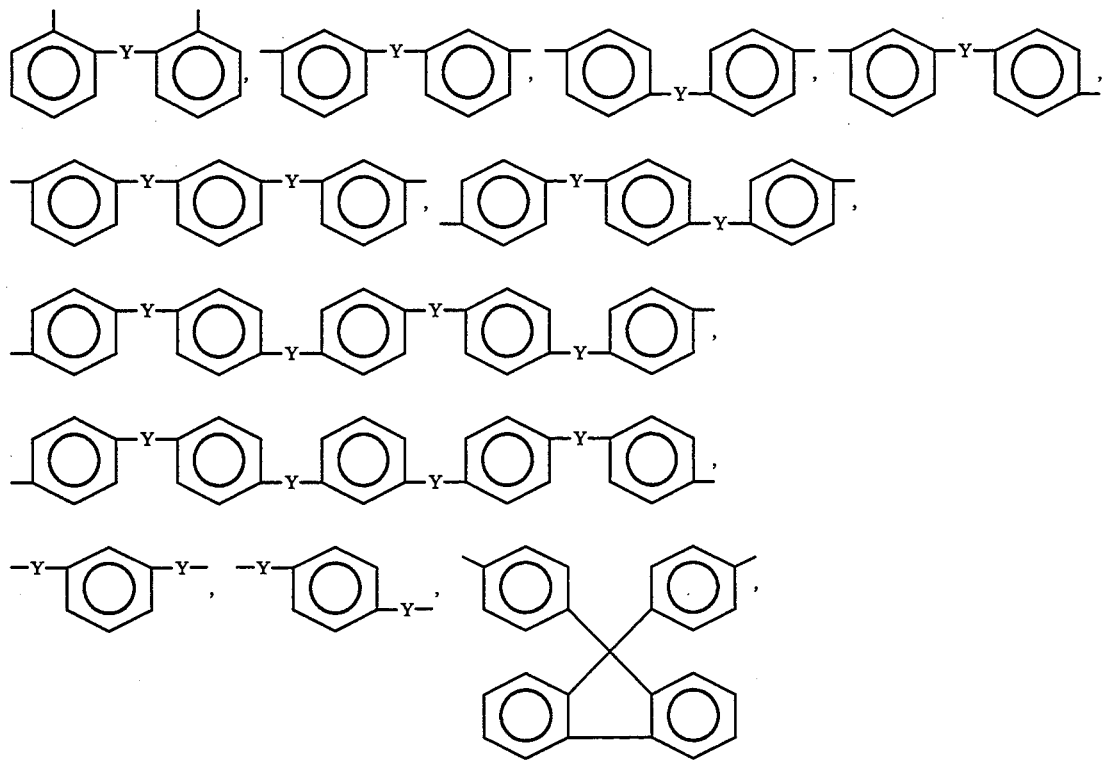

wherein Y is not a substituent or is a substituent selected from the group consisting of O, S, C=O, SO₂, CH₂, C(CH₃)₂, and C(CF₃)₂.

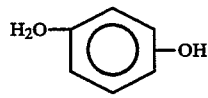

represents either 3-aminophenol or 4-aminophenol.

The following examples illustrate the reaction sequence for the synthesis of several polyimides according to the present invention. However, the invention is not limited to these examples.

EXAMPLE 1

The following example illustrates the reaction sequence for the synthesis of imide/arylene ether block copolymer

X is F, and

R' is

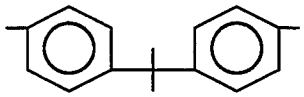

The theoretical number average molecular weight ($\overline{M}_n$) of both the poly(amic acid) block and the poly(arylene ether) block is 6545 g/mole. This copolymer is designated ATPAE 6545//1,3-BABB/BTDA 6545.

Amine Terminated Poly(Arylene Ether)

1,3-Bis(4-fluorobenzoyl)benzene (1,3-FBB) (0.1 m, 32.231 5 g), 2,2-bis(4-hydroxyphenyl)propane (BPA) (0.0925 m, 21.1172 g), 4-aminophenol (0.015 m, 1.637 g), powdered potassium carbonate (0.22 m, 30.4 g), N,N- dimethylacetamide (DMAc) (150 ml) and toluene (40 ml) were added to a three-neck flask equipped with a Dean-Stark trap and nitrogen purge. The reaction was heated to 155° C. during approximately 4 hours while collecting a toluene/water azeotropic mixture and held at 155° C. overnight. The reaction was filtered, neutralized with a small amount of acetic acid and precipitated in water. After washing and boiling in water, drying at 80° C. in vacuum provided a light tan solid in greater than 95% yield. The resulting amine-terminated arylene ether oligomer had $\eta_{inh}=0.29$ dL/g in DMAc at 25° C.

Anhydride Terminated Poly(amic acid)

3,3',4,4'-Benzophenonetetracarboxylic acid dianhydride (BTDA) (0.0035 m, 1.1278 g) was added to a solution of 1,3-bis(4-fluorobenzoyl)benzene (1,3-BABB) (0.003087, m, 1.5452 g) and DMAc (15.2 g) and stirred for 3 hours to provide a viscous, clear yellow solution.

Imide/Arylene Ether Block Copolymer

The amine-terminated arylene ether (2.6730 g) was dissolved in DMAc (15.2 g) to provide a clear brown solution which was added to the anhydride-terminated poly(amic acid) solution. The combined solution became viscous immediately and gelled within approximately 10 minutes. Stirring overnight provided a viscous orange solution ($\eta_{inh}=0.89$ dL/g, DMAC at 25° C.). Casting onto plate glass and curing 1 hour each at 100° C., 200° C., and 300° C. provided a tough, flexible, clear yellow film (Tg=165° C., Tm=335° C. and 350° C., DSC at 20° C./min).

EXAMPLE II

The following example illustrates the reaction sequence for the synthesis of imide/arylene ether block copolymer where The theoretical number average molecular weight ($\overline{M}_n$) of both the poly(amic acid) block and the poly(arylene ether) block is 3110 g/mole. This copolymer is designated ATPE 3110//1,3-BABB/BTDA 3110.

Amine Terminated Poly(Arylene Ether)

1,3-Bis(4-fluorobenzoyl)benzene (1,3-FBB) (0.07 m, 22.562 g), 2,2-bis(4-hydroxyphenyl)propane (BPA) (0.0595 m, 13.583 g), 4-aminophenol (0.021 m, 2.292 g), powdered potassium carbonate (0.154 m, 21.3 g), N,N-dimethylacetamide (DMAc) (115 ml) and toluene (40 ml) were added to a three-neck flask equipped with a Dean-Stark tarp and nitrogen purge. The reaction was heated to 155° C. during approximately 4 hours while collecting a toluene/water azeotropic mixture and held at 155° C. overnight. The reaction was filtered, neutralized with a small amount of acetic acid and precipitated in water. After washing and boiling in water, drying at 80° C. in vacuum provided a light tan solid in greater than 95% yield. The resulting amine-terminated arylene ether oligomer had $\eta_{inh}=0.16$ dL/g in DMAc at 25° C.

Anhydride Terminated Poly(amic acid)

3,3',4,4'-Benzophenonetetracarboxylic acid dianhydride (BTDA) (0.0035 m, 1.1276 g) was added to a solution of 1,3-bis(fluorobenzoyl)benzene (1,3-BABB) (0.00266 m, 1.13315 g) and DMAc (13.9 g) and stirred for 3 hours to provide a clear yellow solution.

Imide/Arylene Ether Block Copolymer

The amine-terminated arylene ether (2.4593 g) was dissolved in DMAc (13.9 g) to provide a clear brown solution which was added to the anhydride-terminated poly(amic acid) solution. The combined solution became viscous within 1 hour ($\eta_{inh}=0.63$ dug, DMAc at 25° C.). Casting onto plate glass and curing 1 hour each at 100° C., 200° C., and 300° C. provided a tough, flexible, clear yellow film (Tg=175° C., Tm=354° C., DSC at 20° C./min).

EXAMPLE III

The following example illustrates the reaction sequence for the synthesis of the imide/arylene ether segmented copolymer when Ar is 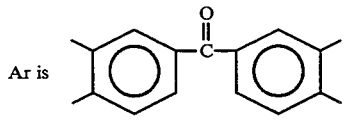

Ar' is 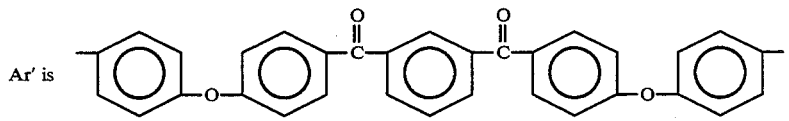

R is 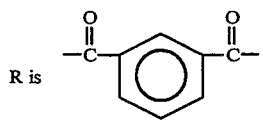

X is F, and

R' is 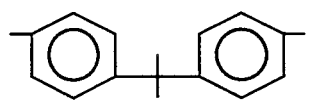

Ar is 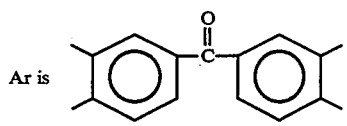

Ar' is 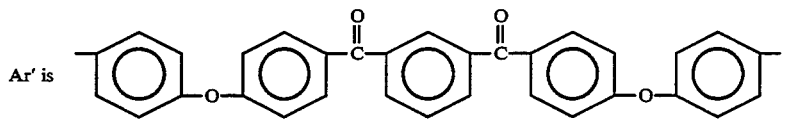

R is 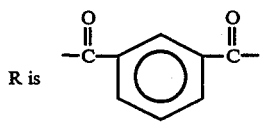

X is F, and

R' is 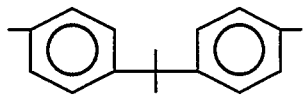

The theoretical $\overline{M}_n$ of the poly(arylene ether) block is 6545 g/mole while the poly(amic acid) segment is of random length but has an average $\overline{M}_n$ of 6545 g/mole. The method of addition of starting materials leads to a final structure for this copolymer of a type which is different from the copolymer described in Example I. This copolymer is designated ATPAE 6545+1,3-BABB+BTDA (6545).

Amine Terminated Poly(Arylene Ether)

This material is the same as the material prepared in Example I.

Imide/Arylene Ether Semi-Block Copolymer

This copolymer was prepared with the poly(amic acid) segment synthesized in the presence of the AT-PAE, not separately as in Example 1.

1,3-BABB (0.002205 m, 1.1037 g) and ATPAE (0.0025 m, 1.9093 g) were dissolved in DMAc (21.6 g). Addition of BTDA (0.0025 m, 0.8056 g) produced a viscous solution immediately that gelled within approximately 15 minutes. Stirring 24 hours at 45° C. produced a clear viscous solution ($\eta_{inh}$=1.15 dL/g, DMAC at 25° C.). Casting onto plate glass and curing 1 hour each at 100° C., 200° C., and 300° C. provided a tough, flexible, clear yellow film (Tg=165° C. and 220° C., Tm=338° C. and 353° C., DSC at 20° C./min).

Data for polymer and copolymer inherent viscosities and glass transition temperatures are presented in Tables I and II.

TABLE I
CHARACTERIZATION OF OLIGOMERS AND POLYMERS

| Oligomer or Polymer | $\eta_{inh}$, dL/g | $T_g(T_m)$, °C. by DSC |
|---|---|---|
| ATPAE 3110 | 0.16 (CHCl$_3$) | 133 |
| ATPAE 6545 | 0.29 (CHCl$_3$) | 146 |
| ATPAE 3110 + BTDA | 0.79 (DMAc) | 165 |
| ATPAE 6545 = BTDA | 1.10 (DMAc) | 222 (350) |
| 1,3-BABB + BTDA | 0.80 (DMAc) | 155 |
| FBB + BPA | 0.70 (CHCl$_3$) | 155 |
| PI + PAE (1:1 blend) | — | 155, 222 (361) |
| ATPAE 6545 + 1,3-BABB + BTDA (6545) | 1.15 (DMAc) | 165, 220 (338, 353) |

TABLE II
CHARACTERIZATION OF BLOCK COPOLYMERS

| Copolymer | Polyamic Acid, $\eta_{inh}$ (dL/g) DMAc | NMP | DSC $T_g(T_m)$, °C. DMAc | NMP | TBA Transition, °C. |
|---|---|---|---|---|---|
| ATPAE 3110//1,3-BABB/BTDA 3110 | 0.63 | 0.90 | 175 (354) | 175 (338, 352) | 193 |
| ATPAE 3110//1,3-BABB/BTDA 6545 | 0.87 | 1.73 | 170 (354) | — (358) | 249 |
| ATPAE 6545//1,3-BABB/BTDA 3110 | 0.81 | 1.00 | 168 (353) | 168 (335, 352) | 185 |
| ATPAE 6545//1,3-BABB/BTDA 4565 | 0.89 | 1.03 | 165 (335, 350) | 164, 220 (343, 355) | 168, 205 |

Data for polymer and copolymer properties, including tensile strength, tensile modulus, elongation, fracture toughness, and fracture energy, are presented in Table III.

TABLE III
FILM PROPERTIES

| Polymer | Tensile Strength, Ksi RT | 93° C. | 177° C. | Tensile Modulus, Ksi RT | 93° C. | 177° C. | Elongation, % RT | 93° C. | 177° C. | $K_{ic}$, psi $\sqrt{in}$ RT | $G_{ic}$, in-lb/in$^2$ RT |
|---|---|---|---|---|---|---|---|---|---|---|---|
| ATPAE 3110/BTDA | 10.9 | 9.1 | 1.2 | 367 | 333 | 124 | 4.0 | 3.3 | 80 | — | — |
| ATPAE 6545/BTDA | 11.1 | 8.5 | — | 367 | 329 | — | 5.7 | 5.2 | >100 | — | — |
| ATPAE 3110//1,3-BABB/BTDA 3110 | 15.0 | 12.7 | 3.4 | 514 | 449 | 135 | 3.5 | 3.2 | 38 | 3370 | 22 |
| ATPAE 3110//1,3-BABB/ | 16.2 | 14.5 | 5.9 | 535 | 516 | 304 | 3.8 | 3.7 | 30 | 3900 | 28 |

TABLE III-continued

| Polymer | Tensile Strength, Ksi | | | Tensile Modulus, Ksi | | | Elongation, % | | | $K_{ic}$, psi $\sqrt{in}$ | $G_{ic}$, in-lb/in² |
|---|---|---|---|---|---|---|---|---|---|---|---|
| | RT | 93° C. | 177° C. | RT | 93° C. | 177° C. | RT | 93° C. | 177° C. | RT | RT |
| BTDA 6545 | | | | | | | | | | | |
| ATPAE 3110//1,3-BABB/BTDA 3110 | 13.2 | 10.5 | 1.4 | 435 | 433 | 35 | 3.1 | 15.1 | 74 | 3930 | 35 |
| ATPAE 3110//1,3-BABB/BTDA 6545 | 14.2 | 10.9 | 2.7 | 519 | 437 | 114 | 4.3 | 3.3 | 49 | 4750 | 44 |
| ATPAE 6545 + 1,3-BABB + BTDA (6545) | 16.0 | 12.7 | 2.2 | 457 | 443 | 85 | 6.1 | 3.8 | 53 | 3350 | 25 |
| 1,3-BABB + BTDA | 22.0 | — | 15.2 | 630 | — | 540 | 8.3 | — | 21 | 4890 | 38 |
| FBB + BPA | 12.7 | 7.5 | — | 381 | 340 | — | 136 | 124 | — | 5070 | 62 |

Figure 2:
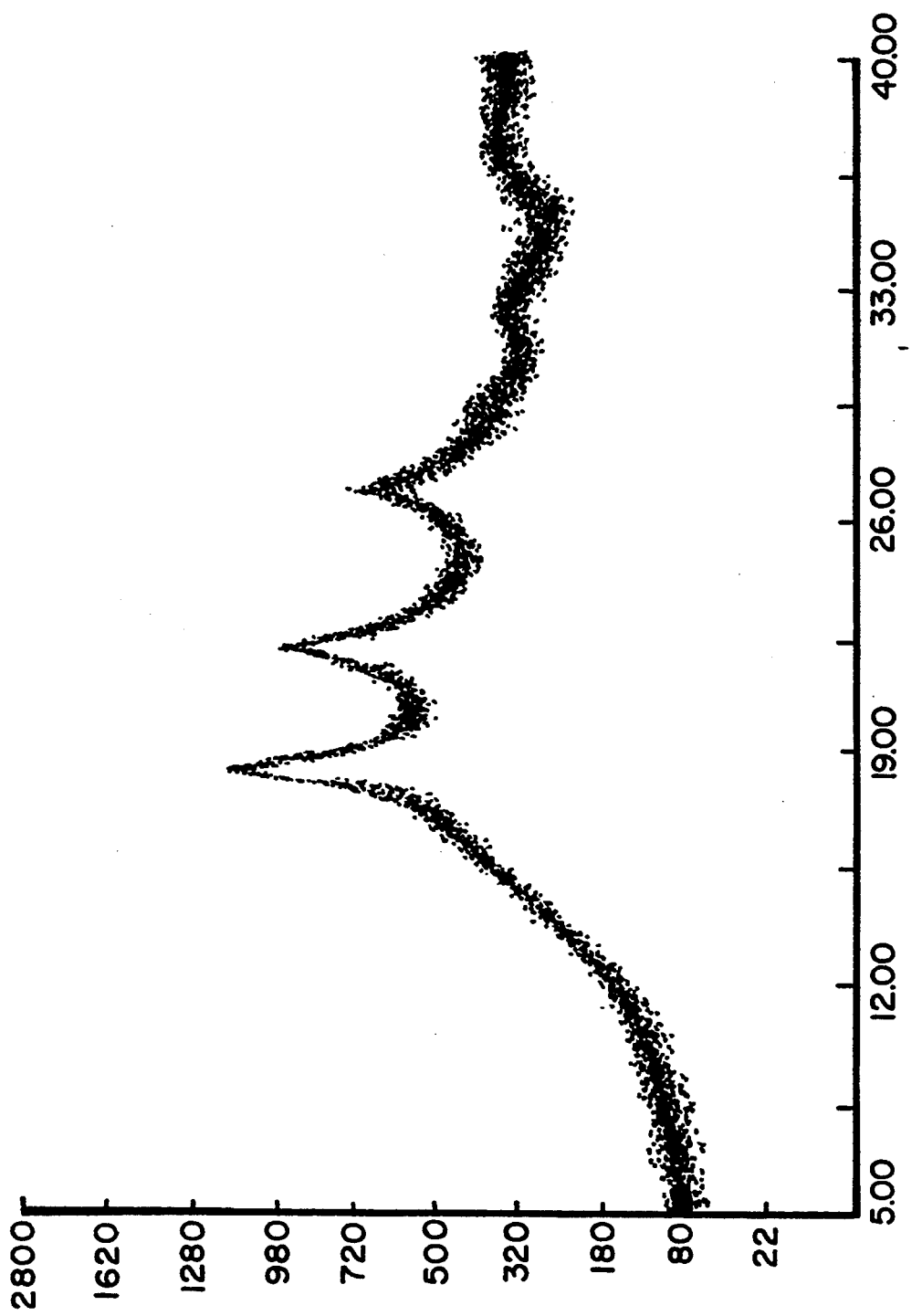
FIG. 2 demonstrates wide-angle x-ray scattering data for a copolymer powder of the present invention.

FIGS. 1 and 2 show wide-angle x-ray scattering data for the ATPAE 6454//1,3-BABB/BTDA 6545 copolymer film and powder, respectively.

What is new and desired to be secured by Letters Patent of the United States is:

1. A crystalline imide/arylene ether block copolymer prepared by reacting an anhydride terminated polyamic acid and an amine terminated poly(arylene ether) in a polar aprotic solvent and cyclodehydrating the intermediate poly(amic acid), the anhydride terminated poly(amic acid) having the formula:

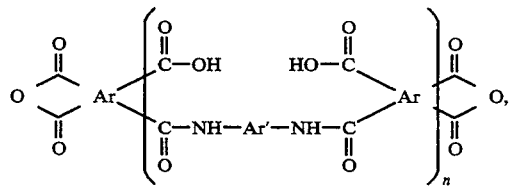

n is an inter from 4 to 100; wherein

Ar is

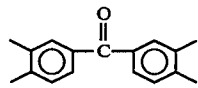

and

Ar' is

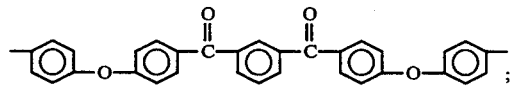

and the amine terminated poly(arylene ether) having the formula

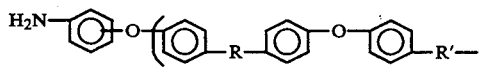

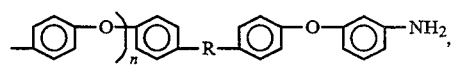

wherein n is an integer from 4 to 100;

R is

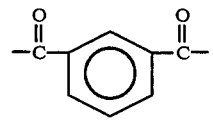

and

R' is

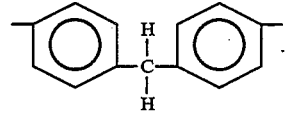

2. The crystalline imide/arylene ether block copolymer of claim 1, wherein the theoretical number average molecular weight of both the poly(amic acid) block and the poly(arylene ether) block is between about 1000 g/mole and 10,000 g/mole.

3. The crystalline imide/arylene ether block copolymer of claim 1, wherein the theoretical number average molecular weight of both the poly(amic acid) block and the poly(arylene ether) block is about 3000 g/mole.

4. The crystalline imide/arylene ether block copolymer of claim 1, wherein the theoretical number average molecular weight of both the poly(amic acid) block and the poly(arylene ether) block is about 6500 g/mole.

5. The crystalline imide/arylene ether block copolymer of claim 1, wherein the theoretical number average molecular weight of the poly(arylene ether) block is 6545 g/mole, and the poly(amic acid) block is of random length, but whose number average molecular weight is 6545 g/mole.

6. The crystalline imide/arylene ether block copolymer of claim 1, wherein the theoretical number average molecular weight of the poly(arylene ether) block is between about 1000–10,000 g/mole, and the poly(amic acid) block is of random length, but whose number average molecular weight is about 1000–10,000 g/mole.

* * * * *